United States Patent [19]
Aihara et al.

[11] Patent Number: 5,859,951
[45] Date of Patent: Jan. 12, 1999

[54] IMAGING PARAMETER RECORDING APPARATUS, IMAGING METHOD AND EDITING SYSTEM

[75] Inventors: Kenichi Aihara, Tokyo; Yoshio Chiba; Taku Kihara, both of Kanagawa, all of Japan

[73] Assignee: Sony Corporation, Tokyo, Japan

[21] Appl. No.: 976,982

[22] Filed: Nov. 24, 1997

Related U.S. Application Data

[63] Continuation of Ser. No. 397,227, Apr. 20, 1995, Pat. No. 5,729,363, which is a continuation of PCT/JP94/01175 Jul. 18, 1994.

[30] Foreign Application Priority Data

Jul. 16, 1993 [JP] Japan .................................. 05-176761

[51] Int. Cl.$^6$ .................................................. H04N 5/76
[52] U.S. Cl. ........................... 386/107; 386/38; 358/906
[58] Field of Search ................................ 386/46, 52, 55, 386/62, 1, 4, 107, 117, 129, 131, 40, 95, 38; 358/906, 909.1; H04N 5/76

[56] References Cited

U.S. PATENT DOCUMENTS

| | | | |
|---|---|---|---|
| 5,262,867 | 11/1993 | Kojima | 358/906 |
| 5,274,457 | 12/1993 | Kobayashi et al. | 358/906 |
| 5,392,068 | 2/1995 | Suzuki et al. | 358/906 |
| 5,543,925 | 8/1996 | Timmermans | 386/40 |

*Primary Examiner*—Thai Tran
*Assistant Examiner*—Huy Nguyen
*Attorney, Agent, or Firm*—Frommer Lawrence & Haug, LLP; William S. Frommer

[57] ABSTRACT

An imaging parameter recording apparatus and an imaging apparatus are disclosed. The setting states of various parts of an imaging system 1 at the time of imaging are detected by a system controller 9 and routed as imaging parameters to a recording/reproducing system 2. These imaging parameters are recorded along with the imaging data on a video tape 17. This enables not only the picture corresponding to the imaging data but also the imaging parameters at the imaging time to be reproduced at the reproducing time, so that not only the past setting state-can be recognized, but also the past setting state can be newly set so that the picture of the same picture pattern can be imaged.

5 Claims, 7 Drawing Sheets

IMAGING PARAMETER RECORDING APPARATUS, IMAGING METHOD AND EDITING SYSTEM

This application is a continuation of application Ser. No. 08/397,227, filed Apr. 20, 1995, U.S. Pat. No. 5,729,363, which is a continuation of PCT/JP94/01175 Jul. 18, 1994.

TECHNICAL FIELD

This invention relates to an imaging parameter recording apparatus, an imaging method and an editing system advantageously employed for an integrated system for imaging and editing an object. More particularly, it relates to an imaging parameter recording apparatus, an imaging method and an editing system for re-generating the picture pattern at the time of past imaging, correcting the picture pattern to a desirable pattern and unifying the picture pattern of the reproduced picture by recording imaging conditions at the time of imaging and imaging signals of the object and by enabling the imaging parameters to be unified to desirable imaging parameter values.

BACKGROUND ART

Nowadays, a video camera apparatus is known, in which the imaging light is received by a so-called CCD image sensor for forming imaging signals which imaging signals are recorded on a video tape.

With such video camera apparatus, the focusing, zooming or the iris is manually set by a user prior to starting the imaging. When the imaging is started, the imaging light is introduced via the imaging lens so as to be received by the CCD image sensor. Thus the electrical charges corresponding to the received imaging light are accumulated in the CCD image sensor.

The system controller reads out the charges accumulated in the CCD image sensor under so-called electronic shutter control at a time interval specified by a manual operation or in response to the received light volume. The electrical charges read out from the CCD image sensor are outputted as imaging signals so as to be fed to a preamplifier.

The preamplifier amplifies the imaging signals at a pre-set gain and transmits the amplified signals to a video amplification circuit (video amplifier).

The video amplifier has its gain, flare correction degree and shading correction degree controlled by control signals from the system controller. Thus the video amplifier performs flare correction and shading correction on the imaging signals and amplifies the corrected signals with a gain variably controlled by the system controller in order to output the amplified signals. The amplified imaging signals from the video amplifier are supplied to an imaging signal processing circuit.

The imaging signal processing circuit clamps the pedestal level (black level) of the imaging signals and processes the imaging signals with gamma correction and contour enhancement, while affording knee characteristics to the processed imaging signals, under control by the system controller, and transmits the resulting imaging signals to an encoder. The encoder digitizes the imaging signals to produce imaging data and encodes the imaging data in a pre-set manner suited to recording in order to output the resulting encoded data. The time code indicating the imaging time and date is superimposed on the imaging data and the resulting data is supplied to a rotary head.

The rotary head digitally azimuth-records the imaging data and the time code on a video tape.

This allows the imaging data and the time code to be reproduced during reproduction so that the imaging data and time by the time code may be displayed on a screen along with the picture corresponding to the imaging data.

In a broadcasting station, it becomes frequently desirable to select a desired picture to be used in a program from among plural images recorded on plural video tapes and to edit the images in their entirety on a single video tape.

However, since the desired selected images were directly joined to one another with the conventional editing, such that the pictures of the same picture pattern produce difference in the display mode at a junction between the images to give the alien feeling to the viewer.

That is, since the plural video tapes are made up of images taken at different places and at different timing, such that, when the pictures, such as the pictures of the sky, imaged under geographically or temporally different conditions and joined to each other by editing, produce an inconvenience such as sudden changes in brightness in the reproduced combined image, with the junction as a boundary. Alternatively, if the pictures ahead and at back of the junction are images indoors and outdoors, the reproduced picture shows sudden change in brightness on both sides of the junction due to changes in indoor and outdoor color temperature.

On the other hand, if there is any reproduced image having a picture pattern suited to the viewer's taste, it may occur that the viewer is desirous to know the setting state of the video camera device in which the image was taken, such as the iris opening degree, video amplifier gain, the level of shading correction or-the level of gamma correction of the imaging signal processing circuit.

However, the setting state of past imaging operations cannot be realized with the conventional video camera device, such that imaging cannot be performed in the manner of re-generating past picture patterns.

While it may be contemplated that the setting state of the pst imaging operation can be recognized if the user records the imaging setting state on a memo, an extremely laborious operation is involved because the setting state needs to be confirmed for each imaging operation. In addition, it is well-nigh impossible to recognize the setting state during the imaging operation.

In view of the foregoing, it is an object of the present invention to provide an imaging parameter recording apparatus, an imaging method and an editing system in which imaging parameters indicating the setting state of various components during the imaging can be recorded along with the imaging signals and in which reproduced image can be edited to a desirable picture pattern by optionally changing the imaging parameter values.

DISCLOSURE OF THE INVENTION

In one aspect, the present invention provides an imaging parameter recording apparatus according to the present invention includes imaging means for producing imaging signals by imaging an object under imaging conditions which are based on imaging parameters, and means for recording the imaging signals and imaging parameters relating to the imaging signals on the same recording medium. The imaging parameter recording apparatus also includes reproducing means for reproducing the imaging signal and the imaging parameters recorded on the recording medium, and means for displaying the imaging signals and the imaging parameters reproduced by the reproducing means. The imaging parameter recording device also includes means for changing the values of the imaging parameters displayed on the display means, and means for recording imaging parameters changed in value by the changing means on a removable parameter recording medium.

The imaging parameter recording apparatus may further includes means for reproducing the imaging parameters from the parameter recording medium, which imaging means produces imaging signals based on the imaging parameters reproduced by the parameter reproducing means.

The imaging means may have an imaging device for converting an imaging light into electrical signals, and a white balance adjustment circuit for adjusting the white balance of the output signals of the imaging device. The imaging parameters then are white balance adjustment data for adjusting the white balance.

The imaging means has an imaging device for converting an imaging light into electrical signals, and an iris for adjusting the volume of incident light on the imaging device, in which case the imaging parameters are data indicating the iris opening value.

The imaging means may have an imaging device for converting an imaging light into electrical signals, and a contour enhancement circuit for performing a contour enhancement operation on an output signal of the imaging device, in which case the imaging parameters are data indicating the contour enhancement level.

In its another aspect, the present invention provides an imaging parameter recording apparatus for recording imaging parameters defining imaging parameters for imaging means on an imaging parameter recording medium removably loaded on the imaging means. The imaging parameter recording apparatus includes reproducing means for reproducing imaging signals and the imaging parameters from the recording medium having recorded thereon the imaging signals and the imaging parameters relating to said imaging signals, and display means for displaying the picture based on the imaging signals and the imaging parameters, reproduced by the reproducing means. The imaging parameter recording apparatus also includes changing means for changing the values of the imaging parameters displayed on the display means, and recording means for recording the imaging parameters changed by the changing means on the imaging parameter recording medium.

The imaging means may have an imaging device for converting an imaging light into electrical signals, and a white balance adjustment circuit for adjusting the white balance of an output signal of the imaging device, in which case the imaging parameters are white balance adjustment data for adjusting the white balance.

In its further aspect, the present invention provides an imaging method including the steps of (a) recording imaging signals generated on imaging a desired object by imaging means and imaging parameters of the imaging means at a time point of generation of the imaging signals on the same recording medium, (b) reproducing the imaging signals and the imaging parameters from the recording medium for displaying a picture corresponding to the imaging signals and the imaging parameters, (c) changing the values of the imaging parameters based on the displayed picture, and (d) recording the changed imaging parameters on a removable imaging parameter recording medium.

The above imaging method may further include the steps of (f) loading an imaging parameter recording medium, having the imaging parameters recorded thereon at the step (d), on any of the imaging means, (g) reading out the imaging parameters from the loaded imaging parameter recording medium, and (h) imaging the object after adjusting the setting state of the imaging means in accordance with the read-out imaging parameters.

With the imaging parameter recording device and the imaging method according to the present invention, the imaging parameters for each imaging event may be recorded along with the imaging signals on the recording medium. Thus it becomes possible to completely omit the laborious operation of confirming the imaging parameters for each imaging event and recording on a memo or the like.

The past setting state of the imaging means may be easily recognized by reproducing the imaging parameters and the past setting state can be easily newly set so that imaging may be made in such a manner as to re-create the picture pattern at the time of the past imaging operation.

On the other hand, if there is any favorite picture among the pictures displayed on the display means, the imaging parameters of the picture may be recorded and kept on the imaging parameter recording medium either directly or after suitably changing the imaging parameters.

In its further aspect, the present invention provides an editing system for editing imaging signals from a plurality of master side recording media for recording on slave side recording medium, each of the master side recording media having recorded thereon imaging signals and imaging parameter indicating imaging conditions of the imaging means at a time of generation of the imaging signals. The editing system includes master side reproducing means for reproducing the imaging signals and the imaging parameters from a desired one of the master side recording media and signal processing means connected to the master side reproducing means, processing the imaging signals supplied from the reproducing mens in a desired manner and outputting the resulting imaging signals, and slave side recording/reproducing means connected to the signal processing means for recording the imaging signals and the imaging parameters from the signal processing means on the slave side recording medium and for reproducing at least the imaging parameters among the imaging signals and the imaging parameters recorded on the recording medium. The editing system further includes system control means for controlling the master side reproducing means, the signal processing means and the slave side recording/reproducing means, which system controlling means controls the signal processing means on the basis of imaging parameters reproduced by the slave side recording/reproducing means and imaging parameters reproduced by the master side reproducing means from another of the master side recording medium, for changing signal processing parameters for imaging signals reproduced from such another master side recording medium at the signal processing means. The system control means controls the slave side recording/reproducing means for recording imaging signals processed under the changed parameters on the slave side recording medium.

The signal processing means includes an inverse non-linear signal processing circuit for performing inverse non-linear signal processing on the imaging signals, a linear processing circuit for performing linear signal processing on an output signal of the inverse non-linear signal processing circuit and a non-linear signal processing circuit for performing non-linear signal processing on an output signal of the linear signal processing circuit.

In its further aspect, the present invention provides an editing system for editing imaging signals from a plurality of master side recording media for recording on slave side recording medium, each of the master side recording media having recorded thereon imaging signals and imaging parameter indicating imaging conditions of the imaging means at a time point of generation of the imaging signals. The editing system includes master side reproducing means for reproducing the imaging signals and the imaging parameters from a desired one of the master side recording media, and signal processing means connected to the master side reproducing means, processing the imaging signals supplied from said reproducing mens in a desired manner and outputting the processed imaging signals, and slave side recording/reproducing means connected to the signal processing means for recording the imaging signals from the signal processing means on the slave side recording medium. The editing system also includes memory means for storing imaging parameters reproduced from a desired one of the master side recording media by the master side reproducing means.

The editing system may similarly include an inverse non-linear signal processing circuit for performing inverse non-linear signal processing on the imaging signals, a linear processing circuit for performing linear signal processing on an output signal of the inverse non-linear signal processing circuit and a non-linear signal processing circuit for performing non-linear signal processing on an output signal of the linear signal processing circuit.

In a still further aspect, the present invention provides an editing system for editing imaging signals from a plurality of master side recording media for recording on slave side recording medium, each of the master side recording media having recorded thereon imaging signals and imaging parameter indicating imaging conditions of the imaging means at a time point of generation of the imaging signals. The editing system includes master side reproducing means for reproducing said imaging signals and the imaging parameters from a desired one of the master side recording media, and signal processing means connected to the master side reproducing means, processing the imaging signals supplied from said reproducing mens in a desired manner and outputting the processed imaging signals. The editing system also includes slave side recording/reproducing means connected to the signal processing means for recording the imaging signals from the signal processing means on the slave side recording medium, imaging parameter reproducing means for reproducing imaging parameters from a removable imaging parameter recording medium, and system control means for controlling the master side reproducing means, signal processing means, slave side recording means and the imaging parameter reproducing means. The system controlling means controls the signal processing means on the basis of imaging parameters reproduced by the imaging parameter reproducing means and imaging parameters reproduced by the master side reproducing means from another one of the master side recording media for changing signal processing parameters for imaging signals reproduced from such another master side recording medium. The system controlling means controls the salve side recording means for recording the imaging signals processed by the changed parameters on the slave side recording medium.

The editing system may similarly include an inverse non-linear signal processing circuit for performing inverse non-linear signal processing on said imaging signals, a linear processing circuit for performing linear signal processing on an output signal of the inverse non-linear signal processing circuit and a non-linear signal processing circuit for performing non-linear signal processing on an output signal of the linear signal processing circuit.

Thus, with the editing system of the present invention, the picture pattern of imaging signals recorded on one of the master side recording media may be matched to that of imaging signals recorded on the other master side recording medium for recording on the slave side recording medium. Alternatively, the picture patterns of two imaging signals recorded on the same master side recording medium may be matched to each other for recording on the slave side recording medium. Alternatively, the picture pattern of the imaging signals recorded on the slave side recording medium may be unified to the picture pattern conforming to the imaging parameters reproduced from the imaging parameter recording medium.

Thus the editing may be made so that the imaging signals will be recorded on the slave side recording medium with a unified picture pattern for avoiding an inconvenience that he picture pattern becomes different at a junction between two pictures.

Picture pattern unification is crucial in broadcasting and telecasting businesses so that an alien sense will not be entertained by the viewer. The editing system of the present invention is in meeting with such demand.

BEST MODE FOR CARRYING OUT THE INVENTION

Figure 1:
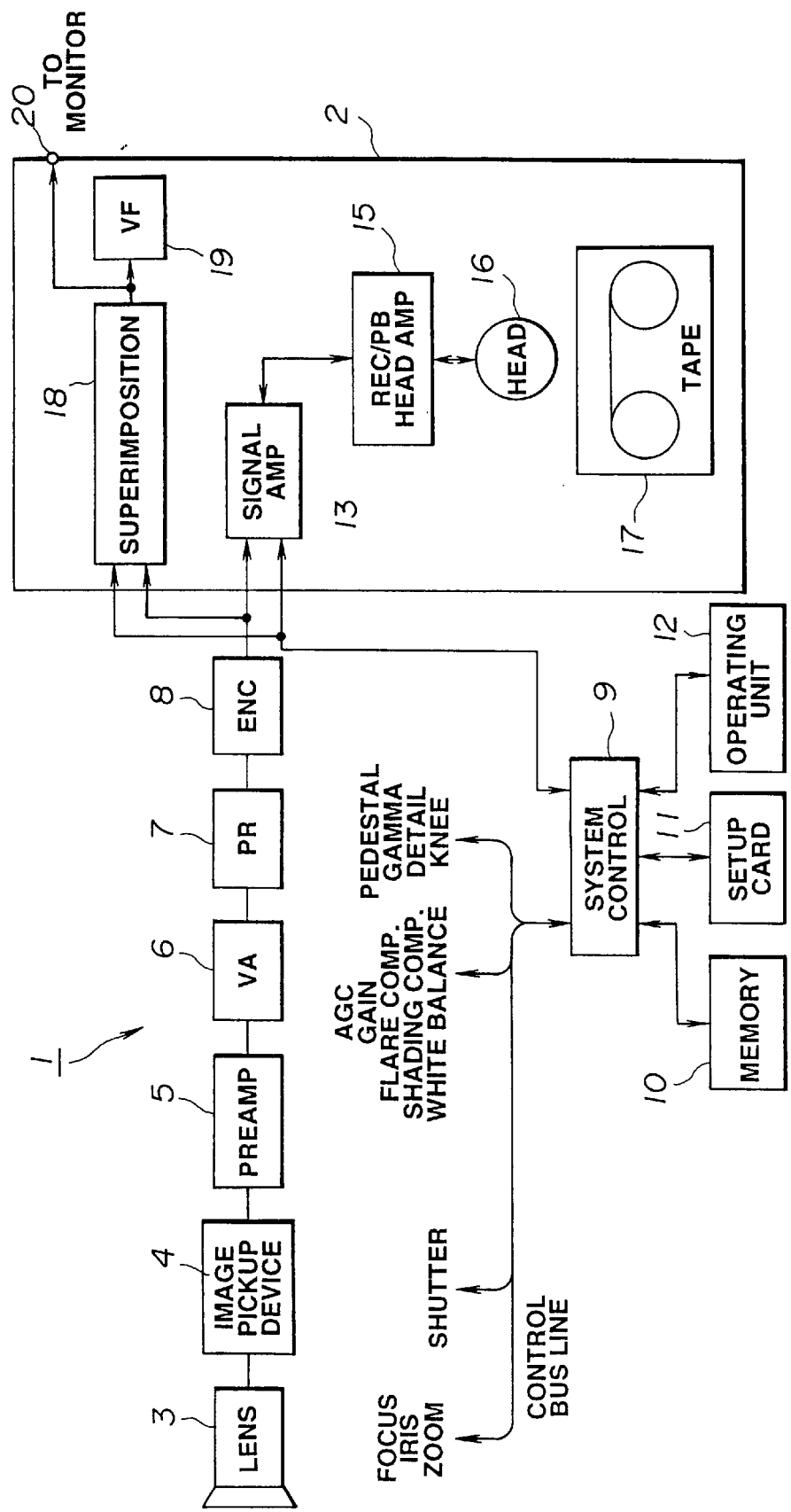
FIG. 1 is a block diagram of a video camera apparatus according to a first embodiment in which the imaging parameter recording device and the imaging method of the present invention are applied.

Referring to the drawings, the imaging parameter recording apparatus, imaging method and the editing system according to the present invention will be explained in detail.

The imaging parameter recording apparatus and the imaging method according to the present invention may be applied to a video camera apparatus, as shown in FIG. 1.

The video camera apparatus of the first embodiment is made up of an imaging system 1 and a recording/reproducing system 2.

The imaging system 1 includes an imaging lens 3 for receiving the imaging light, a CCD image sensor 4 for receiving the imaging light from the imaging lens 3 for forming imaging signals and a pre-amplification circuit (pre-amplifier) 5 for amplifying the imaging signals from the CCD image sensor 4.

The imaging system 1 also includes a video amplifier 6 for performing control operations, such as shading correction, flare correction or white balance control on the imaging signals from the preamplifier 5 and amplifying the processed imaging signals with a gain automatically set by automatic gain control and a gain which may be variably set to three stages, and an imaging signal processing circuit 7 for processing output imaging signals from the video amplifier 6 with gamma correction and black level control. The imaging system 1 also has an encoder 8 for digitizing the imaging signals from the imaging signal processing circuit 7 to form imaging data an encoding the resulting imaging data in a manner suited to recording.

The imaging system 1 also has a system controller 9 for detecting the zooming ratio of the imaging lens 3, an electronic shutter speed of the CCD image sensor 4, shading correction degree of the video amplifier 6 or the gamma correction degree of the imaging signal processing circuit 7 for generating imaging parameters showing the setting states of the above components.

The imaging system 1 finally includes a memory 10 for restoring the above imaging parameters, a setup card recording/reproducing unit 11 for recording or reproducing imaging parameters on or from a removable magnetic card, referred to herein as a setup card, and an operating unit 12 having change keys for changing the imaging parameters to desired values.

The recording/reproducing system 2 has an amplification circuit 13 for amplifying the imaging data and imaging parameters formed by the imaging system 1, and a recording/reproducing amplifier circuit 15 for amplifying the imaging data and the imaging parameters for recording/reproduction at the time of recording/reproduction. The recording/reproducing system 2 also has a rotary head 16 for digitally azimuth recording the imaging data and the imaging parameters from the recording/reproducing amplifier circuit 15 on a video tape 17 and reproducing the imaging data and the imaging parameters from the recording track.

The recording/reproducing unit 2 finally includes a superimposition circuit 18 for superimposing the imaging parameters detected by the system controller 9 on the imaging signals from the encoder 8 for supplying the superimposed signal to an electronic view finder 19 and an external output terminal 20 connected to e.g., a monitoring device.

The operation of the video camera apparatus of the first embodiment having the above constitution is now explained.

In FIG. 1, the user variably manually sets the setting state of various components of the imaging system 1. Specifically, the user manually sets the focusing, iris and zooming of the imaging lens 3 as well as the gain, flare correction degree, shading correction degree and white balance of the video amplifier 6. In addition, the user manually sets the black level, gamma correction level, contour enhancement level or knee characteristics of the imaging signal processing circuit 7.

The setting state of the various components of the imaging system 1 may also be automatically set by the system controller 9.

When the various components of the imaging system 1 have been set as described above, the imaging light is introduced via the imaging lens 3, so that the imaging light is radiated on the CCD image sensor 4.

The CCD image sensor 4 receives the imaging light and accumulates electrical charges corresponding to the received imaging light. The electrical charges accumulated in the CCD image sensor 4 are read out in accordance with the so-called electronic shutter control by the system controller 9 so as to be supplied as imaging signals to the video amplifier 6 via the pre-amplifier 5.

The video amplifier 6 performs white balance control as well as flare correction and shading correction on the imaging signals so that characteristics as pre-set by the user will be realized. In addition, the video amplifier 6 amplifies the imaging signal with a gain automatically set by the system controller 9 and a gain which may be variably set in three stages depending on imaging conditions, and routes the amplified signal to the imaging signal processing circuit 7.

The imaging signal processing circuit 7 clamps the pedestal level (black level) of the imaging signal, while processing the imaging signal with gamma correction and contour enhancement, based upon a control signal from the system controller 9, while appending knee characteristics to the imaging signal and supplying the-resulting signals to the encoder 8.

The encoder 8 digitizes the imaging signals to form imaging data and encodes the imaging data in a manner suited to recording. The encoded imaging signals are fed to the amplifier circuit 13 and the superimposition circuit 18.

The system controller 9 detects control values of focusing, iris and zooming of the imaging lens 3, an electronic shutter speed of the CCD image sensor 4, gain of the video amplifier 6, white balance, flare correction and shading correction values, pedestal level of the imaging signal processing circuit 7, gamma correction and contour enhancement values and adds knee characteristic values, as the imaging parameters, on the frame-by-frame basis. These imaging parameters are fed to the amplifier circuit 13 and the superimposition circuit 18.

The superimposition circuit 18 has a character generator having stored therein character data associated with the imaging parameters, such as numbers, alphabetical letters, Roman letters and katakana characters. When fed with the imaging parameters from the system controller 9, the superimposition circuit 18 reads out character data corresponding to the imaging parameters from the character generator and superimposes the character data on the imaging data from the encoder 8 in order to route the superimposed imaging data to the electronic view finder 19 and to the external output terminal 20.

This displays the image of the object being imaged and the imaging parameters indicating the setting state of various components during imaging on the view finder 19. Thus the user may view the imaging parameters without distracting his or her attention from the electronic view finder 19 during imaging. Thus, if the user viewing the imaging parameters during imaging is inclined to change the setting state of various components, he or she may optionally change the setting state, such as the iris, shading correction degree or contour enhancement, in order to effect imaging.

On the other hand, the amplifier circuit 13 amplifies the imaging data supplied from the encoder 8 and the system controller 9, with a pre-set gain, and routes the imaging parameter to the rotary head 16 via the recording/playback amplification circuit 15.

The rotary head 16 digitally azimuth-records the imaging data and the imaging parameters on the video tape 17 for forming a recording track.

Figure 2:
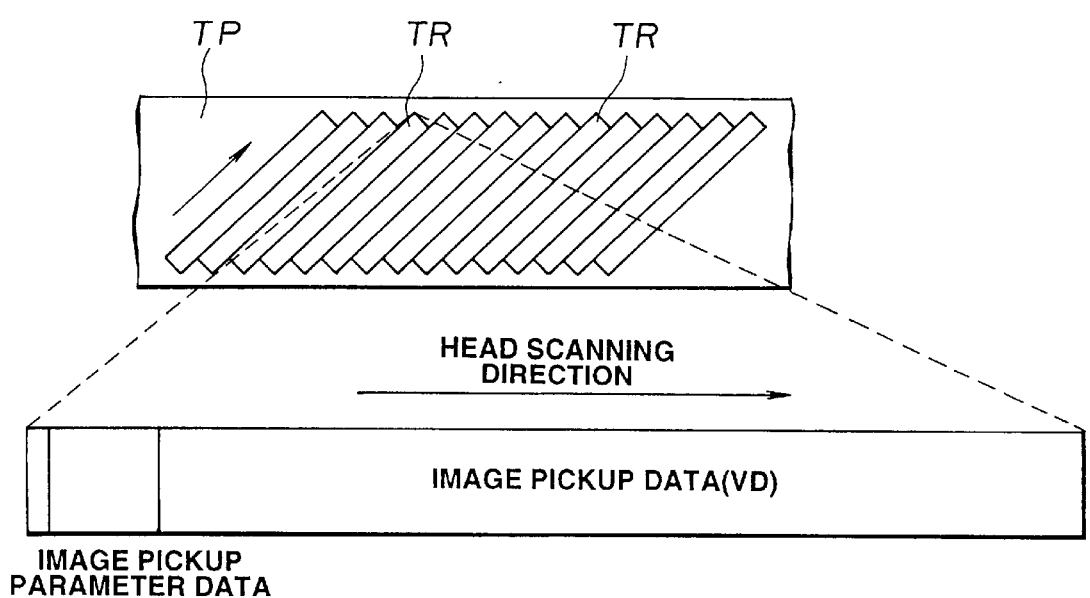
FIG. 2 schematically shows a recording format of the recording data and imaging parameters recorded on a video tape of the video camera apparatus.

Specifically, the one-field imaging data VD is adapted to be recorded an a single recording track TR, as shown in FIG. 2, in which each one set of the imaging parameters PD concerning the imaging data is recorded on two recording tracks, that is for each frame.

Meanwhile, the imaging parameters may also be detected by the system controller 9 on the field basis. In such case, each set of the imaging parameters PD is recorded on one recording track.

Thus, by detecting the imaging parameters during imaging, and recording them along with the imaging data, it becomes possible to avoid the laborious operation of ascertaining the imaging parameters for each imaging operation and recording them on a memo.

The imaging data and the imaging parameters recorded on the video tape 17 are reproduced by the rotary head 16 during reproduction. The reproduced imaging data and the imaging parameters are fed to the amplifier circuit 13 via the recording/playback amplification circuit 15.

During reproduction, the amplifier circuit 13 separates the imaging data and the imaging parameters supplied thereto via the recording/playback amplifier circuit 15 from each other and amplifies them at a pre-set gain. The amplified imaging data and the amplified imaging parameters are supplied to the superimposition circuit 18 and to the system controller 9, respectively.

The superimposition circuit 18 reads out character data corresponding to the imaging parameters from the character generator as discussed above and superimposes the letter data on the picture data in order to supply the superimposed data to the view finder 19 and the external output terminal 20.

Thus the imaging parameters under which the imaging data was recorded during the past imaging operation are displayed on the view finder 19, so that the user ia able to easily recognize the setting states of the various components during the past imaging operation and to easily re-set the past setting state, thus rendering it possible to realize the imaging of reproducing the past picture pattern.

In addition, if the user should make an enquiry to the manufacturer if any trouble in a video camera apparatus is responsible for marred playback image, the maintenance personnel is able to check the imaging parameters used for imaging, in addition to the playback picture. Thus the maintenance personnel may recognize whether the cause of trouble lies in the apparatus or in the setting mistake on the part of the user and accordingly take proper measures.

The video camera apparatus of the present first embodiment is adapted to record only the imaging parameters on a separate recording medium for later reference.

That is, the video camera apparatus has, in addition to the video tape 17, a setup card recording/reproducing unit 11 capable of leading e.g., a setup card thereon.

If the usee has found a picture pattern suited to his or her taste in the picture displayed on the electronic view finder 19, he or she may act on the operating unit 12 in order to fetch the imaging parameters for the picture.

During reproduction, the imaging parameters separated from the imaging parameters in the amplifier circuit 13 are routed to the system controller 9. Thus, when the fetching of the imaging parameters is specified, the system controller 9 writing-controls the setup card recording/reproducing unit 11 for storing the imaging parameters which are being reproduced and being supplied from the amplification circuit 13. Thus causes the setup card recording/reproducing unit 11 to store the desired imaging parameters on the setup card.

On the other hand, if the user viewing the picture displayed on the view finder 19 desires to record on the setup card the imaging parameters of a picture enhanced in contour to a slightly higher extent or a picture adjusted in white balance, he or she acts on the operating unit 12 in order to change the imaging parameters based on his or her experience.

If the change in the imaging parameters is indicated, the system controller 9 writing-controls the memory 10 for transiently storing the imaging parameters supplied from the amplifier circuit 13. The system controller 9 forms imaging parameters, the values of which are changed responsive to the operation of the operating section 12, and routes the formed imaging parameters to the superimposition circuit 18. The superimposition circuit 18 reads out character data corresponding to the imaging parameters from the system generator 9 in order to superimpose the letter data on the imaging data. The resulting superimposed data is supplied to the electronic view finder 19. The imaging parameters, variably controlled responsive to-actuation of the operating unit 12, are displayed on the electronic view finder 19.

The user thus actuates the operating unit 12 in order to adjust the values of the imaging parameters displayed on the electronic view finder 19 to desired values. When the values of the imaging parameter displayed on the electronic view finder 19 assumes a desired value, the operating unit 12 is actuated for fetching the imaging parameters.

When the fetching of the imaging parameters is indicated, the system controller 9 reads out the original imaging parameters stored in the memory 10 and changes the parameter values to those as set by the user in order to control the setup card recording/reproducing unit 11 for recording on the setup card.

In this manner, the original imaging parameters may be changed so that the imaging parameters corresponding to the desired picture patterns of the user will be recorded on the setup card.

Once the imaging parameters have been stored in the setup card, it become possible to perform the imaging in accordance with the setting state of various components responsive to the imaging parameters.

That is, the user loads the setup card into which the user has recorded the desired imaging parameters on the setup card recording/reproducing unit 11 in order to actuate the operating unit 12 for reading out the imaging parameters. Thus the system controller 9. readout-controls the setup card recording/reproducing unit 11 for reading out the imaging parameters recorded in the setup card, and controls the setting state of various component parts of the imaging lens 3, CCD image sensor 4, video amplifier 6 and the imaging signal processing circuit 7 responsive to these imaging parameters.

This reproduces the past imaging states in order to make it possible to image the picture having the same picture pattern as that for the past imaging.

In the above description of the present embodiment, the imaging parameters detected during the imaging and the reproduced or changed imaging parameters are confirmed on the electronic view finder 19. However, there are occasions wherein it is desired to confirm the imaging parameters on a large screen. In such case, the user externally connects a monitor device to the external output terminal 20. This routes the imaging data and the imaging parameters to the monitor device via the external output terminal 20, so that characters corresponding to the imaging parameters are displayed along with the picture corresponding to the imaging data. Thus the user is able to inspect and ascertain the picture and the imaging parameters displayed on the monitor device more precisely than with the use of the electronic view finder 19.

The editing system according to the present invention may be applied to a setup card forming apparatus which is designed for selecting desired imaging parameters from the video tape imaged by the video camera apparatus of the first embodiment, recording the selected desired imaging parameters on the setup card, changing the imaging parameters reproduced from the video tape to desired values, and re-recording the changed imaging parameters on the setup card.

Figure 3:
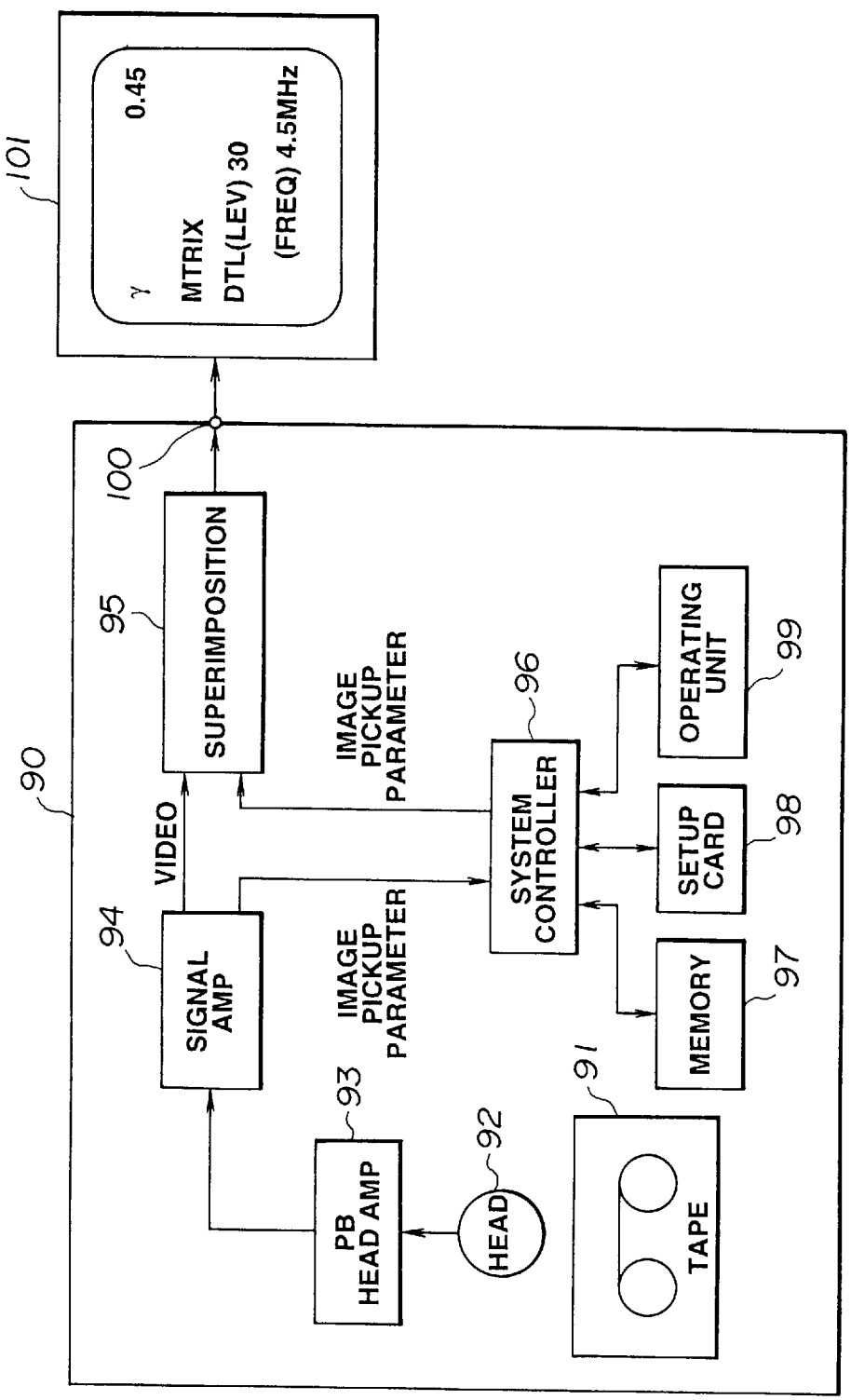
FIG. 3 is a block diagram showing a setup card forming apparatus according to a second embodiment in which the editing system according to the present invention is applied.

Referring to FIG. 3, the setup card forming apparatus 90 according to the second embodiment includes a rotary head 92 for reproducing the imaging data and the imaging parameters from the video tape 91 and an amplifier circuit 93 for amplifying the imaging data and the imaging parameters reproduced by the rotary head 92 at a pre-set gain.

The setup card forming apparatus 90 also includes an amplifier circuit 94 for separating the imaging data and the imaging parameters from the playback amplifier circuit 93 from each other and outputting them after amplification at pre-set gains, a system controller 96 for controlling the setup card forming apparatus 90 in its entirety, and a memory 97 for temporally storing the imaging parameters supplied via the amplifier circuit 94 and the system controller 96 at the time of changing the imaging parameters.

The setup card forming apparatus further includes a setup card recording/reproducing unit 98 for recording/reproducing the imaging parameters as selected by the user or changed in values on or from the setup card, and an operating unit 99 for reproducing the video tape 91 or changing the imaging parameters.

The setup card forming apparatus 90 further includes a superimposition circuit 95 for superimposing the imaging parameters supplied via the system controller 96 on the imaging data from the amplifier circuit 94 and outputting the resulting superimposed data, and an external output terminal 100 connected to an external equipment, such as a monitoring device 101.

The operation of the above-described setup card forming device according to the second embodiment is now explained.

When selecting desired imaging parameters reproduced from the video tape 91 and recording the selected desired imaging parameters on the setup card by way of editing, the user instructs reproduction of the video tape 91 by the operating unit 99.

The system controller 96 thus controls the reproducing system to reproduce the imaging data and imaging parameters from the video tape 91.

The imaging data and the imaging parameters recorded on the video tape 91 are reproduced by the rotary head 92 and thence supplied to the playback amplifier circuit 93. The playback amplifier circuit 93 amplifies the imaging data and the imaging parameters at respective pre-set gains and routes the amplified data to the amplifier circuit 94.

The amplifier circuit 94 separates the imaging data and the imaging parameters from each other and transmits the imaging data and the imaging parameters to the superimposition circuit 95 and to the system controller 96, respectively.

In such case, the system controller 96 directly transmits the imaging parameters to the superimposition circuit 95.

The superimposition circuit 95 has a character generator having stored therein character data corresponding to the imaging parameters. When fed with the imaging parameters from the system controller 96, the superimposition circuit 95 reads out the character data corresponding to the imaging parameters and superimposes the character data on the imaging data in order to transmit the superimposed data to the external output terminal 100.

The monitor device 101, for example, is connected to the external output terminal 100. Thus the picture corresponding to the imaging data, as well as the characters and numerical figures corresponding to the imaging parameters, are displayed on the monitor device 101.

The user retrieves the picture having the desired pattern or the desired imaging parameter values as he or she views the picture displayed on the monitor device 101. When the picture having the picture pattern suited to the liking of the user or the imaging parameters having the numerical values suited to the liking of the user are displayed, the user actuates the operating unit 99 for fetching the imaging parameters of the picture pattern or the currently displayed imaging parameters.

When instructed by the operating unit 99 to fetch the imaging parameters, the system controller 96 controls the setup card recording/reproducing unit 98 for recording the currently reproduced imaging parameters.

This enables the currently reproduced imaging parameters to be recorded on the setup card by the setup card recording/reproducing unit 98.

The operation of changing the imaging parameters reproduced from the video tape 91 to desired values for recording on the setup card by way of editing is hereinafter explained.

In such case, the user causes the imaging data and the imaging parameters to be reproduced from the video tape 91 as described above. In this manner, a picture based upon the imaging data and characters or numerical values based upon the imaging parameters are displayed on the monitor device 101.

If the user viewing the picture pattern displayed on the monitor device 101 judges that the picture pattern can possibly be improved by enhancing the contour or by varying the gamma correction level, he or she actuates the operating unit 99 for instructing a corresponding change of the imaging parameters.

When instructed to change the imaging parameters, the system controller 96 writing-controls the memory 97 in order to cause the currently reproduced imaging parameters to be stored in the memory 97.

The user then acts on the operating unit 99, based on his or her experiences, for changing the values of the imaging parameters. Thus the system controller 96 forms the imaging parameters having the values corresponding to the actuation of the operating unit 99 and transmits the resulting imaging parameters to the superimposition circuit 95. Thus the imaging parameters corresponding to the actuation of the operating unit 99 are displayed on the monitor device 101.

When the imaging parameters displayed on the monitor device 101 reach desired values, the user actuates the operating unit 99 for fetching the imaging parameters.

This causes the system controller 96 to read out the original imaging parameters from the memory 97 and to change the read-out value to a value as selected by the user. The system controller 96 then controls the recording/reproducing unit 98 for recording the changed imaging parameters.

This causes the changed imaging parameters to be recorded on the setup card.

The operation of changing the imaging parameters recorded on the setup card to desired values for re-recording on the setup card by way of editing is now explained.

In such case, the user actuates the operating unit 99 for instructing the imaging parameters recorded on the setup card to be changed.

When instructed to change the imaging parameters recorded on the setup card, the system controller 96 controls the setup card recording/reproducing unit 98 for reproducing the imaging parameters recorded on the setup card. The imaging parameters reproduced by the setup card recording/reproducing unit 98 from the setup card are routed to the system controller 96.

The system controller 96 routes the reproduced imaging parameters via the superimposition circuit 95 and the output terminal 100 to the monitor device 101, while writing-controls the memory 97 for temporally storing the reproduced imaging parameters therein. This displays the imaging parameters reproduced from the setup card on the display device 101.

The user then actuates the operating unit 22 based on his or her experience for changing the values of the imaging parameters. In this manner, the system controller 99 forms the imaging parameters having values corresponding to the actuation of the operating unit 99 and transmits the imaging parameters to the monitor device 101 via the superimposition circuit 95. This displays imaging parameters having values corresponding to the actuation of the operating unit 99 on the monitor device 101.

The user actuates the operating unit 99 for fetching the imaging parameters when the imaging parameters displayed on the monitor device 101 reach desired values.

This causes the system controller 96 to read out the original imaging data from the memory 97 and to change the values of the original imaging parameters to the values as changed by the user. The system controller controls the setup card recording/reproducing unit 98 for recording the thus changed imaging parameters.

This re-records the thus changed imaging parameters on the setup card.

By loading the setup card, formed by the setup card forming device according to the second embodiment, on the video camera apparatus of the first embodiment, shown in FIG. 1, the various components of the imaging system 1 are automatically set by the system controller 9 as mentioned above, in accordance with the imaging parameters recorded on the setup card, so that imaging may be performed under the same imaging conditions as the past imaging conditions.

The editing system according to the present invention may be applied to an editing system adapted to perform the editing based on plural video tapes on which imaging was carried out by the video camera apparatus according to the first embodiment.

Figure 4:
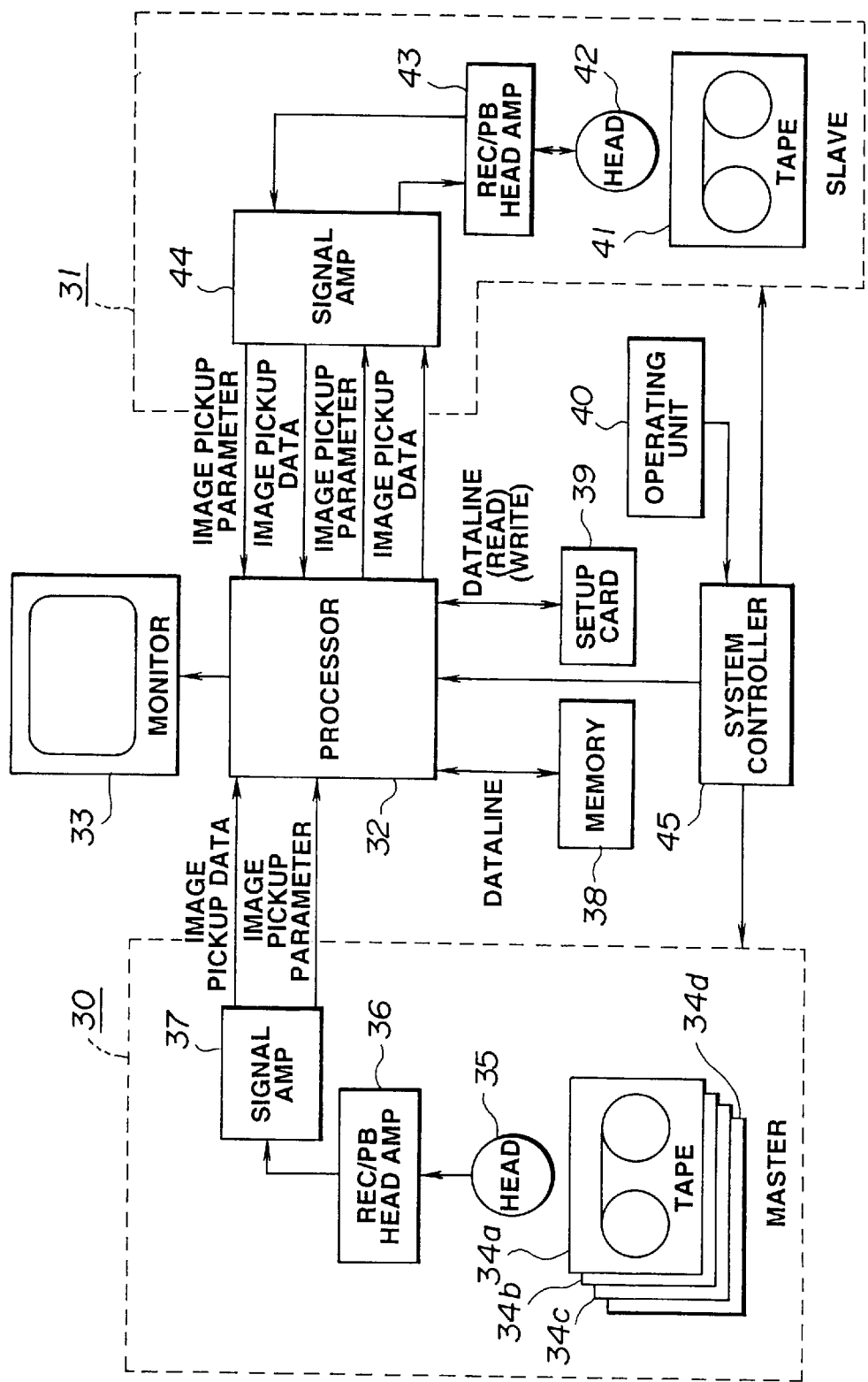
FIG. 4 is a block diagram of an editing system of the present invention.

The editing system, according to the third embodiment, includes a master side reproducing unit 30 for reproducing imaging data and imaging parameters from one or more master tapes 34a to 34d on which the imaging data and the imaging parameters have been recorded by imaging by the video camera apparatus according to the first embodiment, and a slave side recording/reproducing unit 31 for recording/reproducing the imaging data and the imaging parameters reproduced from the master side reproducing unit 30 on e.g., a slave tape 41, as shown in FIG. 4.

The editing system also includes a monitoring device 33 for displaying the image and the imaging parameters corresponding to the imaging data reproduced from the master tapes 34a to 34d or the slave tape 41, a processor 32 for processing the imaging data in accordance with the desired imaging parameters and a system controller 45 for controlling the editing system in its entirety.

The editing system further includes a memory 38 for temporally storing the imaging parameters, a setup card recording/reproducing unit 39 for recording/reproducing the imaging parameters on or from the setup card formed by the video camera apparatus, and an operating unit 40 for changing the imaging parameters, as an example.

The operation of the above-described editing system according to the second embodiment is hereinafter explained.

The editing operation of changing the imaging parameters reproduced from the master tapes 34a to 34d or another master tape (the master tape on which the imaging data of the desired picture and the imaging parameters are recorded) using the imaging parameters of the desired picture reproduced from the above master tapes 34a to 34d, and of processing the imaging data in accordance with the thus changed imaging parameters for recording the processed imaging data on the slave tape 41, is now explained.

In such case, the user actuates the operating unit 40 for designating the desired one of the plural master tapes 34a to 34d on which the reference imaging parameters (reference imaging parameters) are recorded. Thus the system controller 454 playback-controls the master side playback unit 30 for reproducing the master tape having the reference imaging parameters recorded thereon.

The imaging parameters and the imaging data, recorded on the desired master tape, are reproduced by a rotary head 35, and fed via a playback amplifier circuit 36 to a signal amplifier circuit 37. The signal amplifier circuit 37 separates the imaging parameters and the imaging data from each other and routes the separated data and parameters to the processor 32.

The system controller 45 writing-controls the memory 38 via the processor 32 for temporally storing the imaging parameters supplied for the first time, for example, to the processor 32, as the reference imaging parameters.

The user then actuates the operating unit 40 for reproducing the picture data from the same master tape from which the imaging parameters have been fetched, or another master tape, in order to reproduce the picture data recorded on one or the other of the master tapes, that is the data desired to be edited, or duplicated. The user also actuates the operating unit 40 for setting the recording state of the slave side recording/reproducing unit 31. This causes the system controller 45 to control the master side reproducing unit 30 to reproduce the designated master tape.

The imaging data and the imaging parameters, recorded on the thus selected master tape, are reproduced by the rotary head 35 and transmitted via the playback amplifier circuit 36 to the signal amplifier circuit 37, which then separates the imaging data and the imaging parameters from each other and transmits the data and the parameters to the processor 32.

Figure 5:
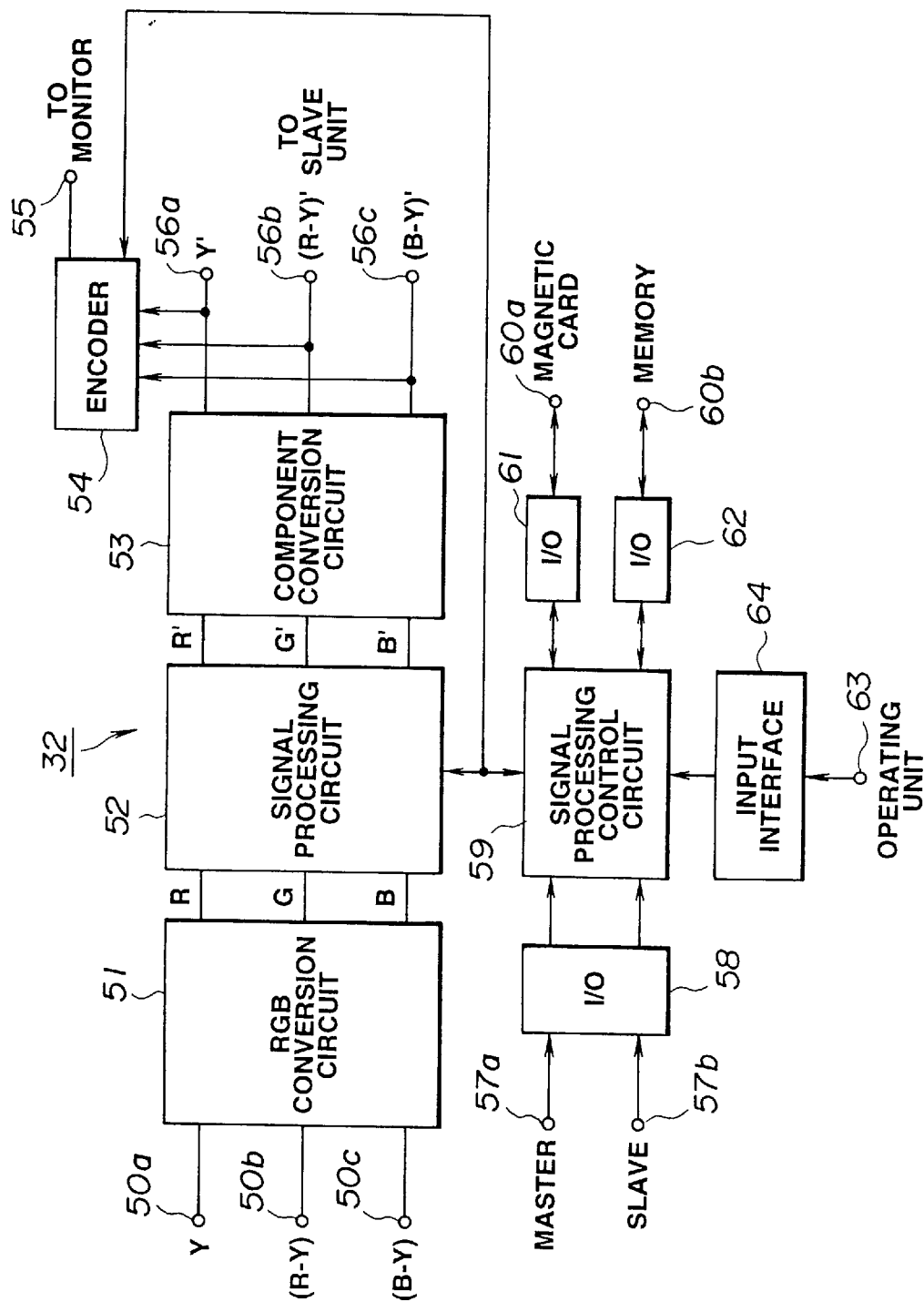
FIG. 5 is a block diagram provided in an editing system according to the second embodiment.

The signal processing system of the processor 32 is configured as shown for example in FIG. 5. That is, the imaging data reproduced from the master tape is fed via input terminals 50a to 50c to an RGB conversion circuit 51 in the form of a luminance (Y) data and two color difference data (R-Y, B-Y). The RGB conversion circuit 51 converts the Y-data, (R-Y) data and (B-Y) data into three color data of red (R), green (G), blue (B), and transmits the R-data, G-data and B-data to a signal processing circuit 52.

The imaging parameters reproduced from the master tape are fed to a signal processing controlling circuit 59 via an input terminal 57a and an input interface 58. The system controller 45 at this time readout-controls the memory 38 in order to read out the transiently stored reference imaging parameters. The imaging parameters read out from the memory 38 are fed to the signal processing control circuit 59 via an input terminal 60b and an input/output interface 62.

Figure 6:
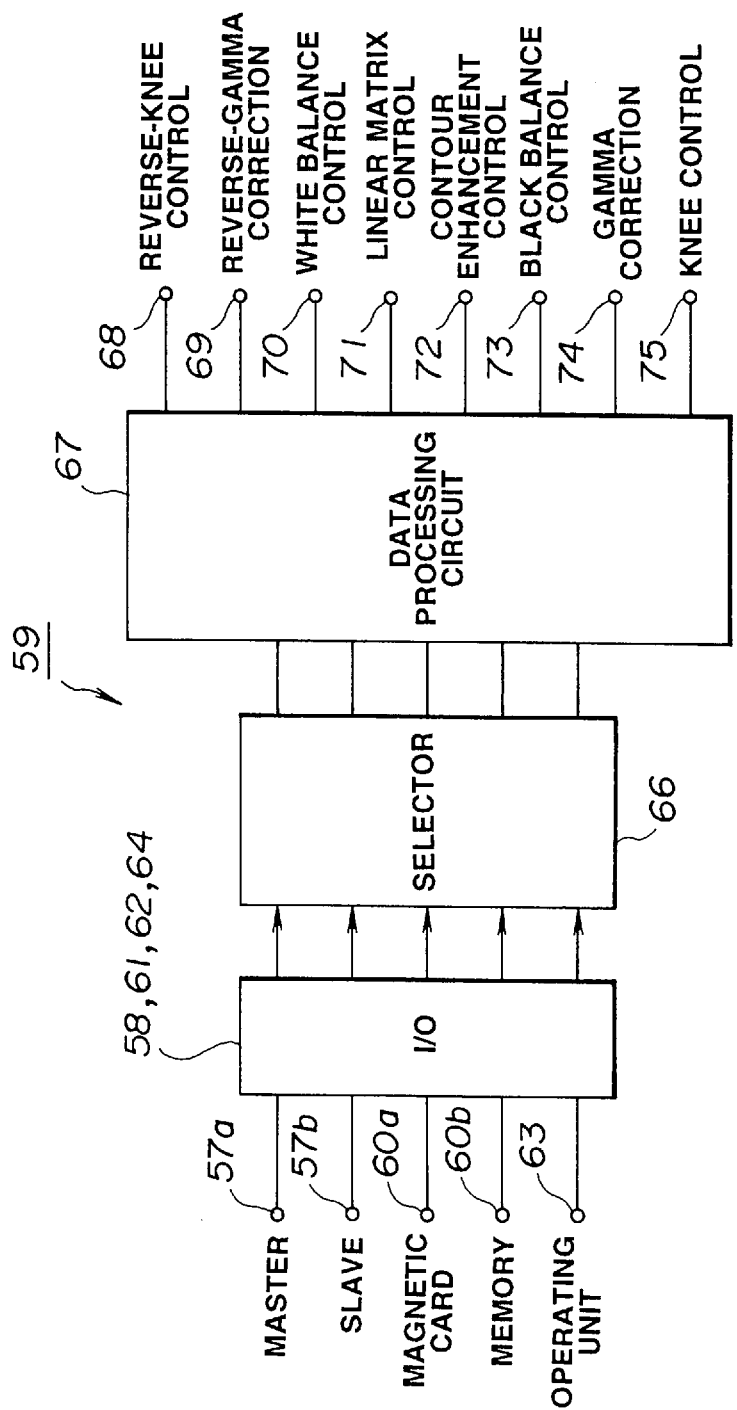
FIG. 6 is a block diagram provided in the system controller.

The signal processing control circuit 59 is made up of a selector 66 and a data processing circuit 67, as shown in FIG. 6.

In such case, the selector 66 selects the imaging parameters supplied via the input/output interface 58 and the reference imaging parameters supplied via the input/output interface 62 responsive to the data processing by the signal processing circuit 52 as later explained and transmits the selected parameters to the data processing circuit 67.

The data processing circuit 67 forms inverse knee control data and inverse gamma correction data based on the imaging parameters reproduced from the master tape, and forms gain control data, linear matrix control data, contour enhancement control data and black balance control data, based on the difference between the reference imaging parameters and the imaging parameters reproduced from the master tape, while forming gamma correction data and knee control data based on the reference imaging parameters, and transmitting these data via output terminals 68 to 75 to the signal processing circuit 52.

Figure 7:
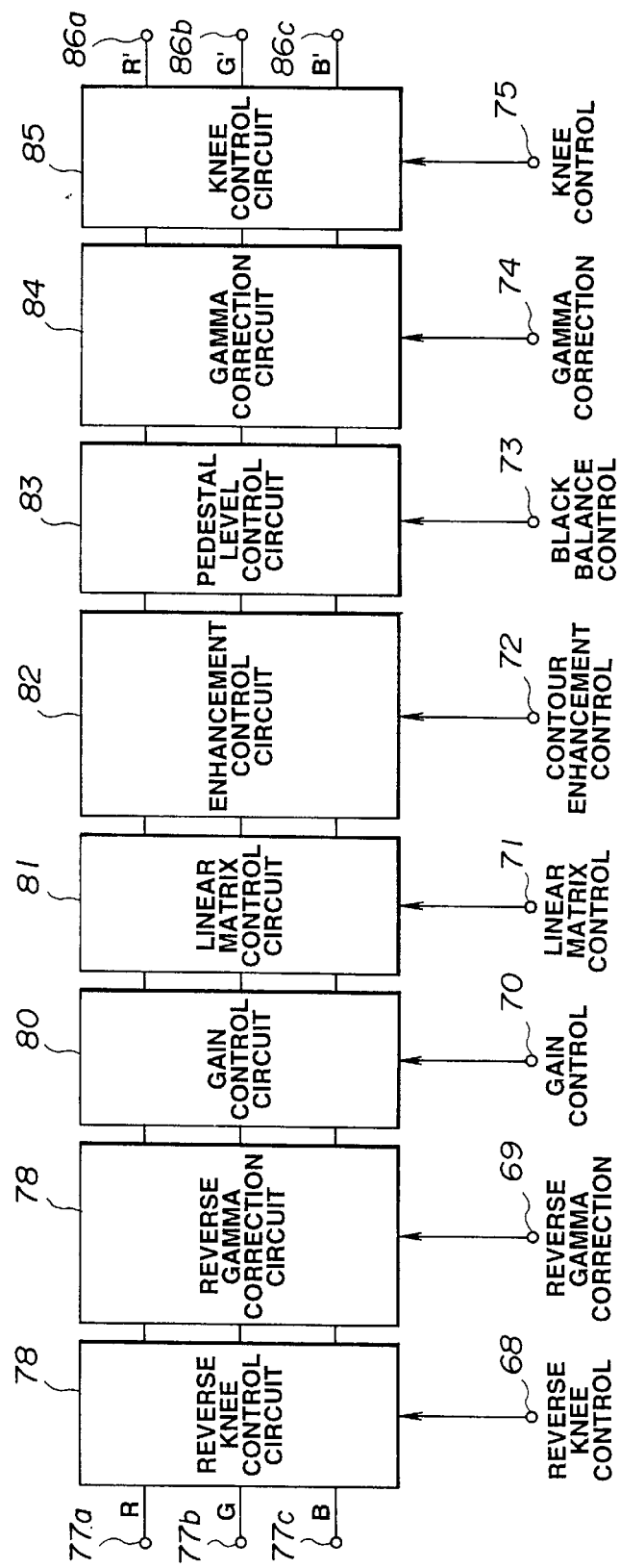
FIG. 7 is a block diagram of a signal processing circuit provided in the system controller.

The signal processing circuit 52 is made up of an inverse knee control circuit 78, an inverse gamma correction circuit 79, a gain control circuit 80, a linear matrix control circuit 81, an enhancement control circuit 82, a pedestal level control circuit 83, a gamma correction circuit 84 and a knee control circuit 85, as shown for example in FIG. 7. The respective control data are supplied to the control circuits 78 to 85 which are responsive to the control data for processing the imaging data.

Specifically, the imaging data reproduced from the master tape are non-linearly processed, such as with gamma correction, before recording. Consequently, for processing the imaging data, the imaging data need be processed with inverse non-linear processing and thereby restored to the original data before being outputted subsequent to non-linearly processing, such as with gamma correction.

To this end, the inverse knee control circuit 78 performs inverse knee control, conforming to the inverse knee control data supplied via input terminal 68, on the R, G and B data supplied via input terminals 77a to 77c, and transmits the resulting data to the inverse gamma correction circuit 79.

The inverse gamma correction circuit 79 performs inverse gamma correction, corresponding to the inverse gamma correction data fed via input terminal 69, on respective inverse knee controlled data, and routes the inverse gamma corrected data to the gain control circuit 80.

The gain control circuit 80 performs gain control processing, responsive to the gain control data supplied via the input terminal 70, on the inverse gamma corrected data, and routes the resulting gain controlled data to the linear matrix control circuit 81.

The linear matrix control circuit 81 performs linear matrix processing, responsive to the linear matrix control data supplied via the input terminal 71, on the gain-controlled data, and routes the resulting data to the enhancement control circuit 82.

The enhancement control circuit 82 performs contour enhancement corresponding to the contour enhancement control data supplied via the input terminal 72, and routes the resulting data to the pedestal level control circuit 83.

The pedestal level control circuit 83 performs black balance control processing, responsive to the black balance control data supplied via the input terminal 73, on the contour enhanced data, and transmits the resulting data to the gamma correction circuit 84.

The gamma correction circuit 84 performs gamma correction, responsive to the above-mentioned gamma correction data supplied via the input terminal 74, on the black-balance controlled data, and transmits the resulting data to the knee control circuit 85.

The knee control circuit 85 performs knee control processing, responsive to the knee control data supplied via the input terminal 75, on the gamma-corrected data, and routes the resulting signals via output terminals 86a to 86c to a component conversion circuit 53 shown in FIG. 5.

The signal processing circuit 52 performs non-linear processing and linear processing, responsive to the reference imaging parameters, on the imaging data reproduced from the master tape, in order to generate imaging data capable of generating a playback picture corresponding to the reference imaging parameters.

The component conversion circuit 53 restores the R, G and B data, processed by the signal processing circuit 52, into the above Y-data, (R-Y) data and (B-Y) data, which are fed to an encoder 54 and to the slave side recording/reproducing unit 31 via output terminals 56a to 56c.

The encoder 54 performs encoding processing for display on the Y-data, (R-Y) data and (B-Y) data, and outputs the resulting encoded data via output terminal 55 to the monitoring device 33 shown in FIG. 4. In this manner, the picture which has been processed in accordance with he reference imaging parameters and which conforms to the imaging data reproduced from the master tape, may be displayed on the monitoring device 33. Thus the user viewing the modified playback picture is able to confirm whether or not the picture has been modified in the desired manner.

The imaging data supplied to the slave side recording/reproducing unit 31 is fed to an amplifier circuit 44. The processor 32 routes the imaging parameters employed for processing the imaging data (the above-mentioned reference imaging parameters) to the amplifier circuit 44, which then superimposes the imaging parameters on the imaging data and routes the resulting superimposed data via a recording/reproducing amplifier circuit 43 to a rotary head 42. The rotary head records the imaging data and the imaging parameters on the slave tape 41.

Thus the imaging data changed in accordance with the above reference imaging parameters may be recorded on the slave tape 41.

In this manner, by selecting the initially reproduced imaging parameters from the master tapes 34a to 34d as the reference imaging parameters, processing the imaging data reproduced from the master tapes 34a to 34d in accordance with the reference imaging parameters and by recording the processed data on the slave tape 41, the picture pattern of the imaging data recorded on one of the master tapes may be superimposed on the picture pattern of the imaging data recorded on the other master tapes and the resulting imaging data may be recorded on the slave tape 41. Alternatively, the picture patterns of the two imaging data recorded on the same master tape may be superimposed and the resulting data may be recorded on the slave tape 41.

This enables unified editing in which the picture pattern of the imaging data recorded on the slave tape 41 will be matched to the reference imaging parameters. Thus there is no inconvenience such that the picture patterns will differ on both sides of a boundary line between two pictures as a result of the editing.

In broadcasting or telecasting business, picture unification is required for avoiding the situation that an alien sense be entertained by the viewers. Since the editing with a unified picture pattern may be achieved with the present editing system, it becomes possible to avoid the inconvenience due to non-unification of the picture patterns.

Next, the editing operation in which the imaging parameters reproduced from the master tapes 34a to 34d are changed with the imaging parameters recorded on the slave tape 41 as the reference, and the imaging data reproduced from the master tapes 34a to 34d is processed on the basis of the changed imaging parameters for re-recording on the slave tape 41, is now explained.

In such case, the user actuates the operating unit 40 and sets the slave side recording/reproducing unit 31 to the playback state. Thus the imaging data and the imaging parameters, recorded on the slave tape, are reproduced by the rotary head 42 and routed via the recording/reproducing amplifier circuit 43 to the amplifier circuit 44.

The amplifier circuit 44 separates the imaging data and the imaging parameters from each other and transmits the separated imaging data and imaging parameters to the processor 32.

When the imaging parameters are supplied to the processor 32, the system controller 45 writing-controls the memory 38 for transiently storing them as reference imaging parameters.

The user then actuates the operating unit 40 for reproducing the desired one of the master tapes 34a to 34d. Thus the imaging data and the imaging parameters are reproduced from the desired master tape and transmitted to the processor 32.

As described above, the imaging data is supplied via the input terminals 50a to 50c shown in FIG. 5 to the RGB conversion circuit 51 for conversion into R, G and B data which are supplied to the signal processing circuit 52. The imaging parameters are transmitted via input terminal 57b and input interface 58 to the signal processing control circuit 59. The reference imaging parameters, stored in the memory 38, are fed via input terminal 60b and input/output interface 62 to the signal processing control circuit 59. The signal processing control circuit 59 forms the gamma correction data and the knee control data, based on the imaging parameters and the reference imaging parameters reproduced from the master tape, and routes the data to the signal processing circuit 52.

The signal processing circuit 52 processes the R, G and B data based on the gamma correction data and the knee control data, and transmits the processes data to the component conversion circuit 53. The component conversion circuit 53 converts the above data into Y-data, (R-Y) data and (B-Y) data which are supplied via output terminals 56a to 56c to the slave side recording/reproducing unit 31 and via encoder 54 and output terminal 55 to the monitor device 33.

On completion of the above processing operation, the system controller 45 controls the slave side recording/reproducing unit 31 to the recording state.

This displays a picture corresponding to the imaging data processed in accordance with the reference imaging parameters on the monitoring device 33, while recording the processed imaging data on the slave tape 41 by the slave side recording/reproducing unit 31.

Thus the picture pattern of the imaging data reproduced from the master tapes 34a to 34d may be unified to the picture pattern conforming to the desired picture imaging parameters recorded on the slave tape 41 for recording on the slave tape 41.

With the present editing system, editing may be made using a setup card formed by recording the desired imaging parameters in the video camera apparatus of the first embodiment or in the video camera apparatus of the second embodiment.

Thus the editing system has the setup card recording/reproducing unit 39 capable of loading the setup card thereon.

After loading the setup card, the user actuates the operating unit 40 for reading out the imaging parameters recorded on the setup card. Thus the system controller 45 readout-controls the setup card recording/reproducing unit 39 for reading out the imaging parameters recorded in the setup card. The imaging parameters read out by the setup card recording/reproducing unit 39 are routed via input/output terminal 60b and input/output interface 61 to the signal processing control circuit 59.

The system controller 45 also write-controls the memory 38 for transiently storing the imaging parameters read out from the setup card recording/reproducing unit 39 as the reference imaging parameters.

The user then actuates the operating unit 40 at the master side reproducing unit 30 for reproducing desired imaging data from the desired master tapes 34a to 34d, while also actuating the operating unit 40 for setting the slave side recording/reproducing unit 31 to the recording state.

Thus the system controller 45 reproduces the imaging data and the imaging parameters from the selected master tape, while reading out the reference imaging parameters from the memory 38. The imaging data and the imaging parameters, reproduced from the master tape, are supplied to the processor 32.

The processor 32 processes the imaging data as described above on the basis of the imaging parameters reproduced from the master tape and the reference imaging parameters read out from the memory 38 and routes the processed data along with the reference imaging parameters to the slave side recording/reproducing unit 31.

In this manner, the imaging data processed on the basis of the reference imaging parameters reproduced from the setup card in the above slave side recording/reproducing unit 31 may be recorded on the basis of the reference imaging parameters reproduced from the setup card. Consequently, the picture pattern of the reproduced picture of the imaging data recorded on the slave tale 41 may be unified to a picture pattern conforming to the reference imaging parameters reproduced from the setup card.

It is possible with the editing system not only to read out the imaging parameters from the setup card but to record the desired imaging parameters on the setup card.

In such case, if there is any favorite picture in the pictures reproduced from the master tapes 34a to 34d or the slave tape 41, the user actuates the operating unit 40 for recording the imaging parameters associated with his or her favorite picture. The system controller 45 then routes the imaging parameters to the setup card recording/reproducing unit 39 shown in FIG. 4 via input/output interface 61 and input/output terminal 60a shown in FIG. 5. The setup card recording/reproducing unit 39 records the imaging parameters supplied from the system controller 45 on the setup card.

Thus the desired imaging parameters may be recorded on the setup card to form an original card unique to the user.

The imaging data may then be processed on the basis of the reference imaging parameters reproduced from the master tapes 34a to 34d, slave tape 41 or the setup card. However, there are occasions wherein there are no desired imaging parameters or wherein there are imaging parameters close to the desired imaging parameters but these imaging parameters are desired to be suitably modified.

In these cases, it is possible with the editing system to actuate the operating unit 40 to modify the imaging parameters.

That is, the user actuates the operating unit 40 in order to display the imaging parameters reproduced from the master tapes 34a to 34d, slave tape 41 or the setup card and desired to be modified. Thus the system controller 45 controls the processor 32 for displaying the imaging parameters reproduced from the master tapes 34a to 34d, slave tape 41 or the setup card on the monitor device 33.

The user then actuates the operating unit 40 in dependence upon the desired values. Thus the changed data, indicating new values of the imaging parameters, are outputted from the operating unit 40 responsive to the user's actuation. The modified data is supplied via the input terminal 63 and the input interface 64 shown in FIG. 5 to the signal processing control circuit 59.

The signal processing control circuit 59 is fed with the imaging parameters reproduced from the master tapes 34a to 34d, the imaging parameters reproduced from the slave tape 41 and the imaging parameters reproduced from the setup card, via input terminal 57a and input interface 58, via input terminal 57b and input interface 58 and via input/output terminal 60a and input/output interface 61, respectively. When fed with the changed data, the signal processing control circuit 59 selects the changed data in place of the imaging parameters, and transmits the changed data via encoder 54 to the monitor device.

Thus the values of the imaging parameters, displayed on the monitor device 33, are variably displayed as values corresponding to the changed data. Each time the imaging parameters are changed, the processor 32 processes the imaging data on the basis of the changed imaging parameters, and transmits the processed imaging data to the monitor device 33. This enables the user to confirm the imaging parameters of the changed values, and to confirm the picture having the picture pattern corresponding to the imaging data processed in accordance with the changed values of the imaging parameters.

Thus the user variably acts on the imaging parameters displayed on the monitoring device 33. When the imaging parameters become equal to the desired values, the user actuates the operating unit 40 for specifying the recording destination of the changed imaging parameters. The recording destinations include the slave tape 41, the setup card or the like.

The system controller 45 causes the changed imaging parameters to be transiently stored in the memory 38. When the recording destination is specified, the imaging parameters stored in the memory 38 are read out and transmitted to the recording destination.

Thus the changed imaging parameters are recorded on the slave tape 41 or the setup card, and the above-mentioned editing operation may be executed using the thus changed imaging parameters.

These imaging parameter changing operations may be carried out based on the user's experiences when the user viewing the imaging parameters or the picture displayed on the monitor device 33 judges that the picture of the desired picture pattern cannot be produced if the editing operation is performed using these imaging parameters as the reference imaging parameters. Above all, in broadcasting or telecasting businesses, there are occasions wherein the imaging parameters are changed delicately to form a better picture, or wherein the imaging parameters are changed significantly to form a picture giving a different vision. For changing the picture pattern, there is no alternative but to carrying out the imaging operation a second time.

However, with the present editing system, the desired picture may be formed by simply changing the imaging parameters, without it being necessary to carry out the change in the imaging parameters. This leads to improved convenience of the editing system.

With the above-described first embodiment of the video camera device, the imaging is carried out using the CCD image sensor 4. However, an image tube may be employed for imaging in place of the CCD image sensor.

With the above embodiments, the imaging parameters and the imaging data are digitally recorded on the recording medium. However, they-may also be recorded in a analog fashion.

In the above embodiments, the setup card is employed a an imaging parameter recording medium for recording the imaging parameters. However, the setup card may also be replaced by a magnetic tape, an optical disc (compact disc or a magneto-optical disc) or a semiconductor memory.

In addition, although the imaging signals and the imaging parameters are recorded on the video tape 17 as the magnetic tape, they may also be recorded on the optical disc (compact disc or a magneto-optical disc) or a semiconductor memory.

What is claimed is:

1. A recording apparatus comprising:

means for setting at least one imaging parameter based upon imaging parameter data recorded in a first removable recording medium;

imaging means for producing imaging signals representing an image by imaging an object under an imaging condition which is based on said imaging parameter;

recording means for recording said imaging signals and said at least one imaging parameter relating to said imaging signals on a second recording medium;

reproducing means for reproducing the imaging signals and said imaging parameter recorded on the second recording medium;

display means for displaying said imaging signals and the imaging parameter reproduced by said reproducing means;

means for manually adjusting the values of the imaging parameter displayed on the display means; and means for recording the manually adjusted imaging parameter on the first recording medium such that the next image is imaged using the manually adjusted imaging parameter.

2. The recording apparatus as claimed in claim 1, further comprising:

imaging parameter reproducing means for reproducing the manually adjusted imaging parameters from said first recording medium; and wherein, said imaging means produces imaging signals based on the imaging parameters reproduced by said imaging parameter reproducing means.

3. The recording apparatus as claimed in claim 1, wherein said imaging means comprises:

an imaging device for converting an imaging light into electrical signals;

a white balance adjustment circuit for adjusting the white balance of the output signals of the imaging device; and wherein, said imaging parameters being white balance adjustment data for adjusting the white balance.

4. The recording apparatus as claimed in claim 1, wherein said imaging means comprises:

an imaging device for converting an imaging light into electrical signals;

an iris for adjusting the volume of incident light on said imaging device; and wherein, said imaging parameters are data indicating the iris opening value.

5. The recording apparatus as claimed in claim 1, wherein said imaging means comprises:

an imaging device for converting an imaging light into electrical signals;

a contour enhancement circuit for performing a contour enhancement operation on an output signal of said imaging device; and wherein, the imaging parameters are data indicating the contour enhancement level.

* * * * *